United States Patent
Liedtke et al.

(10) Patent No.: US 6,600,441 B2
(45) Date of Patent: Jul. 29, 2003

(54) SUBSURFACE EXPLORATORY RADAR DETECTOR FOR A HAND TOOL DEVICE

(75) Inventors: Stefan Liedtke, Lafayette, CA (US); Harald Schmitzer, Wasserburg (DE); John Ewen, Bendern (LI); Klaus Dass, Sax (CH)

(73) Assignee: Hilti Aktiengesellschaft, Schaan (LI)

( * ) Notice: Subject to any disclaimer, the term of this patent is extended or adjusted under 35 U.S.C. 154(b) by 0 days.

(21) Appl. No.: 09/973,408

(22) Filed: Oct. 9, 2001

(65) Prior Publication Data

US 2002/0044078 A1 Apr. 18, 2002

(51) Int. Cl.$^7$ ............................................... G01S 13/88
(52) U.S. Cl. ............................ 342/22; 342/27; 342/59; 342/175; 342/195
(58) Field of Search ............................ 342/22, 25, 27, 342/28, 175, 176–186, 195, 59

(56) References Cited

U.S. PATENT DOCUMENTS

| | | | | |
|---|---|---|---|---|
| 2,575,340 A | * | 11/1951 | Goldstein | 342/22 |
| 3,351,936 A | * | 11/1967 | Feder | 342/22 |
| 3,665,466 A | * | 5/1972 | Hibbard | 342/22 |
| 4,905,008 A | * | 2/1990 | Kawano et al. | 342/22 |
| 5,130,711 A | * | 7/1992 | Kimura et al. | 342/22 |
| 5,248,975 A | * | 9/1993 | Schutz | 342/22 |
| 5,339,080 A | * | 8/1994 | Steinway et al. | 342/22 |
| 5,357,253 A | * | 10/1994 | Van Etten et al. | 342/22 |
| 5,835,053 A | * | 11/1998 | Davis | 342/22 |
| 5,835,054 A | * | 11/1998 | Warhus et al. | 342/22 |
| 5,900,833 A | * | 5/1999 | Sunlin et al. | 342/22 |
| 5,920,285 A | * | 7/1999 | Benjamin | 342/22 |
| 6,002,357 A | * | 12/1999 | Redfern et al. | 342/22 |
| 6,031,482 A | * | 2/2000 | Lemaitre et al. | 342/22 |
| 6,100,839 A | * | 8/2000 | Heger et al. | 342/22 |
| 6,130,641 A | * | 10/2000 | Kraeutner et al. | 342/22 |

* cited by examiner

Primary Examiner—Bernarr E. Gregory
(74) Attorney, Agent, or Firm—Sidley Austin Brown & Wood, LLP

(57) ABSTRACT

A radar detector for exploration of subsurface embedded objects comprising an antenna array (1) for high-frequency electromagnetic waves, which is connected and individually switchable with at least one transmit/receive unit, a time-controlled signal processor, an evaluation device for SAR and a display device. The antenna array (1) exhibiting at least three antennas (sx, rx, sy, ry) scanning an area by their positioning.

8 Claims, 1 Drawing Sheet

SUBSURFACE EXPLORATORY RADAR DETECTOR FOR A HAND TOOL DEVICE

BACKGROUND OF THE INVENTION

Figure 1:
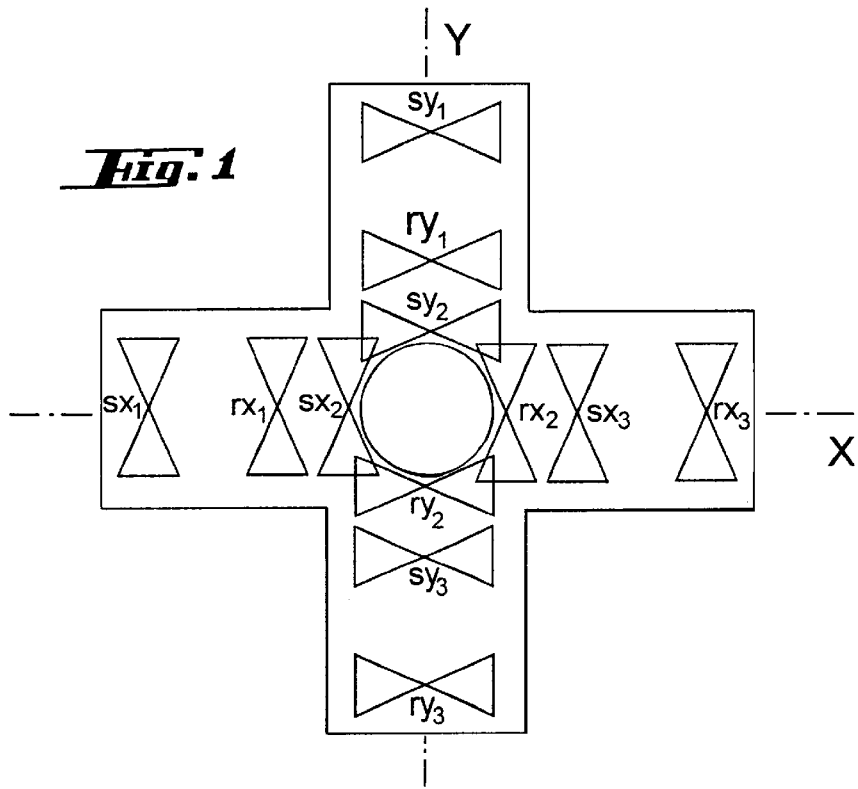

The invention relates to a subsurface exploratory radar detector for a hand tool device such as a percussion drill or a chipping hammer.

The use of a hand tool device when working with masonry embedded with electrical wiring, plastic piping, etc. and steel reinforcement requires knowledge of the presence, the nature, and the location of such lines or steel or iron reinforcement relative to the tool. Such knowledge is important because such embedded objects could damage the tool. Further, such knowledge is important to properly carry out the work, i.e., placement of dowel fastener holes with minimum clearance from lines or steel reinforcements.

U.S. Pat. No. 5,541,605 discloses a subsurface radar detector for detection of reinforcement iron and steel in concrete, wherein the detector operates in the ultra-wideband range and is swept over the surface.

According to U.S. Pat. No. 5,051,748 discloses a portable ground penetrating radar detector operating in the microwave range for the detection of reinforcement iron and steel in concrete. The disclosed radar detector comprises an antenna array with wave guides arranged in intervals along a line, whose pin-hole antennae directly produce a line image which, with a movement of the antenna array diagonally to the direction of the array and in conjunction with a computer, produces a flat image of the buried object, whose image is then displayed on an image output device.

U.S. Pat. No. 5,900,833 discloses a portable radar detector equipped with a synthetic radar antenna (SAR "synthetic aperture radar") whose signals are initially processed in signal processors. The radar detector can produce three-dimensional images of objects buried underground, such as reinforcement steel. Moreover, the images are represented on an image display device. The individual antennas, which need not necessarily be arranged linearly, are moved diagonally to the antenna array to produce a synthetic aperture with the radar detector.

U.S. Pat. No. 5,512,834 discloses a portable subsurface exploration radar detector that detects electrical lines, plastic pipelines, and reinforcement steel when creating bore holes. The radar detector sends and receives narrow band, periodically modulated electromagnetic waves into and from the subsurface area being explored for objects arranged in a near field area. The radar detector makes possible adjustment for depth and provides area resolution by evaluating the pulse forms and the geometry and intervals of the associated antennas of two complete detectors or the receiving antennas of a common transmitter. Depending on the results of the detection, a hand tool, such as a nail gun tool, to which the detector is attached, is controlled automatically via the nail dispenser. Objects that are closely adjacent to one another; for example, those arranged in grids, cannot be oriented with sufficient precision by the two spaced receiving antennas. Similarly, no information is received on the orientation or the depth of embedding of the buried objects.

SUMMARY OF THE INVENTION

The object of the present invention is to provide a subsurface exploration radar detector that is simple to use and can be mounted on the hand tool for the detection of embedded objects situated in close proximity to one another.

This object is achieved, in accordance with the invention, by a radar detector that explores subsurface embedded objects comprising an antenna array for high-frequency electromagnetic waves with at least three antennas having at least one transmit/receive unit. The at least one transmit/receive unit is connected to at least one timed signal processor for paired temporal correlation of the demodulated signals and the one time signal processor is connected in an information transferring manner with an evaluation unit for SAR for resolution of the demodulated signals and to a display device. Moreover, the at least three antennas by their positions together scan an area and wherein the at least three antennas are switchably connected with at least one transmit-receive device.

In essence, a subsurface exploratory radar detector, in accordance with the invention, exhibits at least three high-frequency electromagnetic wave antennas whose positions sweep an area together and which are individually connected with transmit and receive units. The demodulated signals of such antennas can be processed in paired temporal correlation and combined evaluation in a time-controlled signal processor, wherein the processor is in an evaluation unit for SAR and is connected to a display device.

The paired temporal correlation of two of the at least three antennas arranged on a surface and the combined evaluation thereof enables the position in space of buried or embedded objects to be determined without having to reposition the radar detector.

Advantageously, exactly two of the at least three antennas are temporally shifted by the control unit as a transmit-receive antenna pair switchably connected with the radar transmitter or the radar receiver, whereby only one radar transmitter and one radar receiver is required.

Also, at least two antennas are polarized differently relative to each other, whereby the orientation of an elongate object can be ascertained by paired temporal correlation and combined evaluation.

The antennas that are polarized parallel relative to each other are linearly arranged and the two rows are arranged in the shape of an "X" (lit. cross shape). Along each row, the transmit and receive antenna pair that is switchably connected with the radar transmitter or with the radar receiver can be repositioned.

At least three antennas that are polarized parallel relative to one another are arranged in at least one row, whereby two transmit and receive antenna pairs can be switched to different spacing relative to each. In such an arrangement, the depth of embedded objects can be determined independent of the propagation velocity of the radar waves in the subsurface.

The antennas, arranged crosswise in two rows, are further arranged in central symmetry relative to each other, thereby simplifying evaluation.

Also, the arrangement of the antennas in the centrally-symmetrically cross shape forms an empty space at the central intersection, into which a tool can be inserted.

Advantageously, through the evaluation of the characteristic of the reflected radar waves between different materials, for example, plastic and iron, embedded objects can be distinguished and displayed, for example by light-emitting diodes (LED).

The evaluation unit is configured as a neural network, which represents the plurality of combined, paired temporal correlation to be interpreted as an input variable in a numerically limited number of classifications, that are divided into:

centrally punctuate/discrete
vertically elongate
transversely elongate
horizontally elongate
centrally crossed
and
no object
and the classifications are displayed, for example, using an LED.

Also, the depth of the embedded object is displayed on a discrete scale.

Further, all the information is displayed together on a small graphic display.

Moreover, a parameter, such as maximum drilling depth, is transferred from the hand tool and the parameter is taken into consideration in the interpretation.

The classification is transmitted by the evaluation unit as a control signal to the hand tool and utilized by the hand tool for blocking or releasing a work process, for example, drilling.

BRIEF DESCRIPTION OF THE INVENTION

Figure 2:
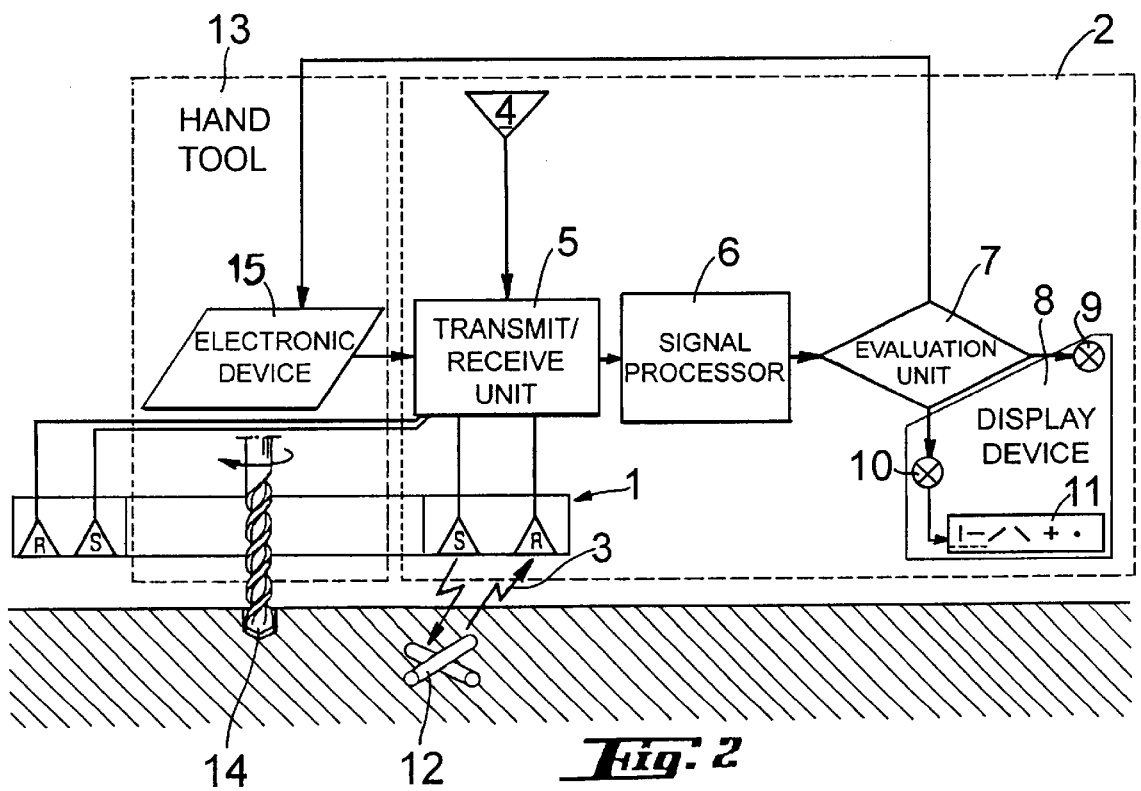

The invention is more fully explained by the description that follows with reference to the following figures:

FIG. 1 illustrates the antenna arrangement, in accordance with the invention; and FIG. 2 illustrates the radar detector, in accordance with the invention.

DETAILED DESCRIPTION OF THE INVENTION

FIG. 1 shows an antenna array 1 with six antenna pairs sx-rx and sy-ry that are positioned together to scan an area. A first half of the antennas sx, rx and a second half of the antennas sy, ry are polarized perpendicular relative to each other. The antennas polarized parallel to each other sx, rx or sy, ry are each spaced linearly as X or Y. The two lines X and Y are arranged crosswise relative to each other. Along each X, Y line a transmit-receive pair sxi-rxj can be switchably moved with i, j=1, 2, 3. In X line six antennas sxi, rxi are arranged such that they are polarized parallel relative to each other, whereby six transmit-receive antenna pairs are switchable using three different spacings. The antennas sx, rx, sy, ry arranged crosswise in the two lines X, Y are arranged in central symmetry relative to each other. In the center O there is an open space.

FIG. 2 shows a radar detector 2 for subsurface exploration 12 using high frequency electromagnetic waves 3 in the high-frequency range. The radar detector 2 comprises the antenna array 1 having transmitter antennas S and receiving antennas R, which are each connected by a timer control unit to a transmit/receive unit 5. The transmit/receive unit 5 is connected to a signal processor 6 that is connected to an evaluation unit 7 configured as a neural network for SAR. The evaluation unit 7 is connected to a display device 8 that displays a green LED 9 for the "No Object" classification and a red LED 10, connected to a graphic display 11 for the material, the depth and the classification of an embedded object 12. A hand tool 13, such as a drill, is connected to the radar detector 2 with a tool 14 that passes and extends through the antenna array 1, and incorporates an electronic device 15 that is connected bi-directionally with the radar detector.

What is claimed is:

1. A radar transceiver for exploration of subsurface embedded objects comprising an antenna array for high-frequency electromagnetic waves with at least three antennas having at least one transmit/receive unit connected to at least one timed signal processor for paired temporal correlation of the demodulated signals, the at least one timed signal processor being connected with an evaluation unit for synthetic aperture radar for resolution of the demodulated signals and to a display device, wherein the at least three antennas by their positions together scan an area and wherein the at least three antennas are switchably connected with at least one transmit-receive device, wherein at least two antennas are polarized parallel relative to each other and are each arranged in linear spacing relative to each other on one of two lines, wherein the two lines are arranged crosswise in the shape of an "X" and wherein the antennas arranged on the two lines arranged in the shape of an "X" are arranged in central symmetry relative to each other and have an open space in the center.

2. The radar detector of claim 1, wherein a precisely temporally shifted transmit-receive antenna pair comprises two antennas of the at least three antennas being switchably connected via a control device with one of a radar transmitter and a radar receiver.

3. The radar detector of claim 1, wherein at least two antennas are polarized differently relative to each other.

4. The radar detector of claim 1, wherein at least three antennas are arranged polarized parallel relative to one another in at least one line.

5. The radar detector of claim 1, wherein, the evaluation device is a neural network.

6. The radar detector of claim 1, wherein the display device is at least one of an LED and a graphic display for displaying the material, the classification, and the depth of the embedded objects.

7. The radar detector of claim 1, wherein the antenna array is connected to a hand tool having a tool mounted thereon, the tool passing through the antenna array.

8. The radar detector of claim 7, wherein the evaluation unit is connected with an electronic device of the hand tool for one of the release and blocking of a work process.

* * * * *